(12) United States Patent
Karam et al.

(10) Patent No.: US 12,173,471 B1
(45) Date of Patent: Dec. 24, 2024

(54) APPLICATORS FOR MICRO-TRENCHING

(71) Applicant: J&PInvesco LLC, Schertz, TX (US)

(72) Inventors: Paul A. Karam, San Antonio, TX (US); David S. Zuniga, San Antonio, TX (US); Carlos Medina, San Antonio, TX (US)

(73) Assignee: J&P Invesco LLC, Schertz, TX (US)

( * ) Notice: Subject to any disclaimer, the term of this patent is extended or adjusted under 35 U.S.C. 154(b) by 477 days.

(21) Appl. No.: 17/447,868

(22) Filed: Sep. 16, 2021

Related U.S. Application Data

(60) Provisional application No. 63/079,725, filed on Sep. 17, 2020.

(51) Int. Cl.
*E02F 5/22* (2006.01)

(52) U.S. Cl.
CPC .................................. *E02F 5/223* (2013.01)

(58) Field of Classification Search
CPC ......... E02F 5/223; H02G 1/06; B28C 9/0463; E01C 23/0966
See application file for complete search history.

(56) References Cited

U.S. PATENT DOCUMENTS

| | | | |
|---|---|---|---|
| 69,611 A | 10/1864 | Ballard | |
| 430,575 A | 6/1890 | Griffin | |
| 1,012,612 A | 12/1911 | Vier | |
| 1,545,167 A | 7/1925 | Optiz | |
| 3,024,930 A | 3/1962 | Sims | |
| 3,043,200 A | 7/1962 | Huttash | |
| 3,111,335 A | 11/1963 | Hickman | |
| 3,130,652 A | 4/1964 | Newton, Sr. | |
| 3,469,824 A | 9/1969 | Futty | |
| 3,572,652 A | 3/1971 | Hale | |

(Continued)

FOREIGN PATENT DOCUMENTS

| | | |
|---|---|---|
| EP | 1103533 | 5/2001 |
| GB | 2158491 | 5/1985 |

OTHER PUBLICATIONS

Bay Lynx Website, "Bay-Lynx Develops Game-Changing Grout Mixer", found online at: https://bay-lynx.com/news/bay-lynx-develops-game-changing-grout-mixer/, May 15, 2018, 4 pages.

(Continued)

*Primary Examiner* — Carib A Oquendo
(74) *Attorney, Agent, or Firm* — Merchant & Gould P.C.

(57) ABSTRACT

An applicator for a cement-based mixture includes an open container hopper having a first end disposed above a second end along a first direction. The open container hopper elongated along a second direction. The second end of the open container hopper is configured as an outlet for the cement-based mixture. A handle is coupled to one side of the open container hopper. A hose connector is coupled to another side of the open container hopper. The hose connector is configured to allow the cement-based mixture to flow into the open container hopper. A frame having a pair of wheels supports the open container hopper such that the second end is positionable above a trench for backfilling. A height adjustor is coupled between the frame and the open container hopper. The height adjustor is configured to selectively adjust a height of the second end along the first direction.

17 Claims, 14 Drawing Sheets

(56) References Cited

U.S. PATENT DOCUMENTS

| | | |
|---|---|---|
| 3,580,147 A | 5/1971 | Kaltenegger |
| 3,623,708 A | 11/1971 | Futty |
| 3,820,914 A | 6/1974 | Zimmerman |
| 4,036,564 A | 7/1977 | Richards |
| 4,085,976 A | 4/1978 | Edwards |
| 4,211,491 A | 7/1980 | Chaney |
| 4,437,766 A | 3/1984 | Joachim |
| 4,630,965 A | 12/1986 | Nguyen |
| 4,781,556 A | 11/1988 | Paul |
| 5,609,836 A | 3/1997 | McManus |
| 5,667,298 A | 9/1997 | Musil |
| 5,795,060 A | 8/1998 | Stephens |
| 5,971,656 A | 10/1999 | Kitsmiller |
| 6,109,826 A | 8/2000 | Mertes |
| 6,290,428 B1 | 9/2001 | Hall |
| 6,439,806 B1 | 8/2002 | Dillingham |
| 6,942,717 B2 | 9/2005 | Armstrong |
| 7,080,955 B2 | 7/2006 | Gregg |
| 7,255,512 B2 | 8/2007 | Wallace |
| 7,410,322 B1 | 8/2008 | Wallace |
| 8,747,547 B1 | 6/2014 | Peters et al. |
| 8,882,905 B1 | 11/2014 | Peters et al. |
| 9,376,343 B2 | 6/2016 | Hernandez et al. |
| 9,486,938 B2 | 11/2016 | Pino |
| 9,816,237 B2 | 11/2017 | Loomis |
| 10,443,211 B2 | 10/2019 | Karam et al. |
| 10,571,045 B2 | 2/2020 | Pino, Jr. et al. |
| 10,571,047 B2 | 2/2020 | Pino, Jr. et al. |
| 10,583,581 B2 | 3/2020 | Hernandez |
| 10,641,414 B2 | 5/2020 | Pino, Jr. et al. |
| 10,688,687 B2 | 6/2020 | Karam |
| 11,168,460 B1 | 11/2021 | Karam |
| 11,173,630 B1 | 11/2021 | Karam |
| 2003/0076737 A1 | 4/2003 | Grassi |
| 2003/0142579 A1 | 7/2003 | Throop |
| 2007/0171764 A1 | 7/2007 | Klein |
| 2016/0138810 A1 | 5/2016 | Owen |
| 2016/0257620 A1 | 9/2016 | Peters et al. |
| 2017/0080601 A1 | 3/2017 | Hernandez |
| 2017/0268184 A1* | 9/2017 | Loomis ............... E01C 23/0973 |
| 2018/0016099 A1* | 1/2018 | Workman ............ E04G 21/025 |
| 2018/0016756 A1 | 1/2018 | Beckman |
| 2018/0038071 A1 | 2/2018 | Jurgens |
| 2018/0106015 A1 | 4/2018 | Pino et al. |
| 2018/0126592 A1 | 5/2018 | Karam |
| 2018/0156357 A1 | 6/2018 | Pino et al. |
| 2018/0313059 A1 | 11/2018 | Karam et al. |
| 2020/0149659 A1 | 5/2020 | Pino, Jr. et al. |
| 2020/0149660 A1 | 5/2020 | Pino, Jr. et al. |
| 2020/0164543 A1 | 5/2020 | Hernandez |
| 2020/0181877 A1* | 6/2020 | Radnich .................. E02F 5/12 |
| 2020/0200292 A1 | 6/2020 | Pino, Jr. et al. |
| 2020/0406501 A1 | 12/2020 | Hernandez |

OTHER PUBLICATIONS

ConcreteProducts.com, "Mixer measures up to grout, flowable fill production", Aug. 2018, 1 page.

* cited by examiner

APPLICATORS FOR MICRO-TRENCHING

RELATED APPLICATIONS

This application claims priority to and the benefit of U.S. Provisional Application No. 63/079,725, filed Sep. 17, 2020, entitled "APPLICATORS FOR MICRO-TRENCHING," which is hereby incorporated by reference in its entirety.

INTRODUCTION

Installation of cables and conduits, for example, fiber optic communication cables or other utility cables, under road or walkway surfaces may involve the excavation of small trenches (sometimes referred to as nano- or micro-trenches) through existing pavement surfaces and subgrade. The desired cable or conduit may then be installed and afterwards the trench is backfilled and repaired up to the layer of pavement structure with a flowable backfill. By only excavating what is required for the cable or conduit, large expanses of cable or conduit can be quickly installed. These small trenches, however, are difficult to repair quickly because of the narrow size and close working conditions typically involved.

Traditional equipment and methods for repairing wide trenches with backfill mixtures are generally too large for use with small trenches. For example, one machine is typically used to place the backfill mixture within the trench and a different machine, or set of machines, is used to compact the backfill mixture within the trench and/or screed the compacted material with the road or walkway surface. As such, a large clean-up of the area is often required before it can be re-opened to traffic. Accordingly, time-efficient equipment and methods are needed to repair small trenches and reduce construction interruptions.

Additionally, flowable fill mixtures used for backfilling small trenches may be rapid-setting and generally require greater flow control than what is currently available. Due to the rapid setting nature of the mixture, continuous agitation is often required to keep the mixture from hardening before being poured into the trench. Slight delays in pouring the mixture can be problematic, because without temporary storage having continuous agitation, the mixture can harden. Also, the flowable backfill is difficult to properly pour within the narrow trench opening and the close working conditions often results in voids within the pour. The narrow trench opening may also result in the flowable backfill overflowing the trench which increases clean-up time and labor costs during the backfill operations.

Applicators for Micro-Trenching

This disclosure describes applicators for backfilling and repairing trenches. The applicators include an open-container hopper with a hose connector. A cement-based flowable fill mixture flows into the hopper via the hose connector and is discharged from the hopper via an outlet opening that is positionable above the trench. The hopper is supported on a frame that enables the height of the outlet opening to be adjustable. A plate may be disposed at least partially around the outlet opening. The plate reduces mixture overflow of the trench. A skirt may be coupled to the plate to help control mixture overflow. Additionally or alternatively, a sliding door for the outlet opening may be coupled to the plate and selectively control the size of the outlet opening on the applicator.

In one aspect, the technology relates to an applicator for a cement-based mixture including: an open container hopper having a first end disposed above a second end along a first direction, the open container hopper elongated along a second direction, wherein the first direction is orthogonal to the second direction, and wherein the second end of the open container hopper is configured as an outlet for the cement-based mixture; a handle coupled to one side of the open container hopper; a hose connector coupled to another side of the open container hopper opposite of the handle relative to the first direction, wherein the hose connector is configured to allow the cement-based mixture to flow into the open container hopper; a frame having a pair of wheels, wherein the open container hopper is supported on the frame such that the second end is positionable above a trench for backfilling; and a height adjustor coupled between the frame and the open container hopper, wherein the height adjustor is configured to selectively adjust a height of the second end relative to the trench and along the first direction.

In an example, the frame is a U-shaped frame having a cross-member and two opposing leg members, the cross-member coupled to the side of the open container hopper that the handle is coupled to. In another example, each of the pair of wheels is coupled to a free end of a respective leg member of the two opposing leg members of the frame. In yet another example, each of the two opposing leg members are pivotably coupled to the cross-member. In still another example, the height adjustor is disposed between the wheel and the cross-member on each of the two opposing leg members. In an example, the height adjustor includes a compression spring and an adjustable length strut.

In another example, a plate at least partially surrounds a perimeter of the second end of the open container hopper. In yet another example, a guide pin is disposed proximate the second end of the open container hopper and adjacent the hose connector. In still another example, a cut-off device is configured to control the flow of the cement-based mixture through the hose connector. In an example, a lever arm for the cut-off device is disposed on the handle.

In another aspect, the technology relates to an applicator for a cement-based mixture including: an open container hopper having a first end disposed above a second end along a first direction, the open container hopper elongated along a second direction, the first direction being orthogonal to the second direction, and wherein the second end of the open container hopper is configured as an outlet for the cement-based mixture; a hose connector coupled to one side of the open container hopper and extending along the second direction, wherein the hose connector is configured to allow the cement-based mixture to flow into the open container hopper; a frame having a pair of wheels, wherein the open container hopper is supported on the frame such that the second end is positionable above a trench for backfilling; and a plate at least partially surrounding a perimeter of the second end of the open container hopper, wherein the plate supports a sliding door configured to selectively adjust a size of the outlet at the second end of the open container hopper.

In an example, the sliding door is spring loaded and biased towards a closed configuration. In another example, the sliding door slides in a direction that is parallel to the second direction. In yet another example, the sliding door slides in a pair of tracks extending along the second direction. In still another example, a cut-off device is configured to control the flow of the cement-based mixture through the hose connector.

In another aspect, the technology relates to an applicator for a cement-based mixture including: an open container hopper having a first end disposed above a second end along a first direction, the open container hopper elongated along a second direction, the first direction being orthogonal to the second direction, and wherein the second end of the open container hopper is configured as an outlet for the cement-based mixture; a hose connector coupled to one side of the open container hopper and extending along the second direction, wherein the hose connector is configured to allow the cement-based mixture to flow into the open container hopper; a frame having a pair of wheels, wherein the open container hopper is supported on the frame such that the second end is positionable above a trench for backfilling; and a plate at least partially surrounding a perimeter of the second end of the open container hopper, wherein the plate supports a skirt configured to extend at least partially into the trench when backfilling.

In an example, the skirt is formed from a flexible material. In another example, the skirt includes a flared section and a tapered section. In yet another example, the skirt includes two discrete members separated by a gap corresponding to a size of the outlet formed by the second end of the open container hopper. In still another example, the plate is supported by at least one additional wheel.

These and various other features as well as advantages which characterize the applicators described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Figure 1:
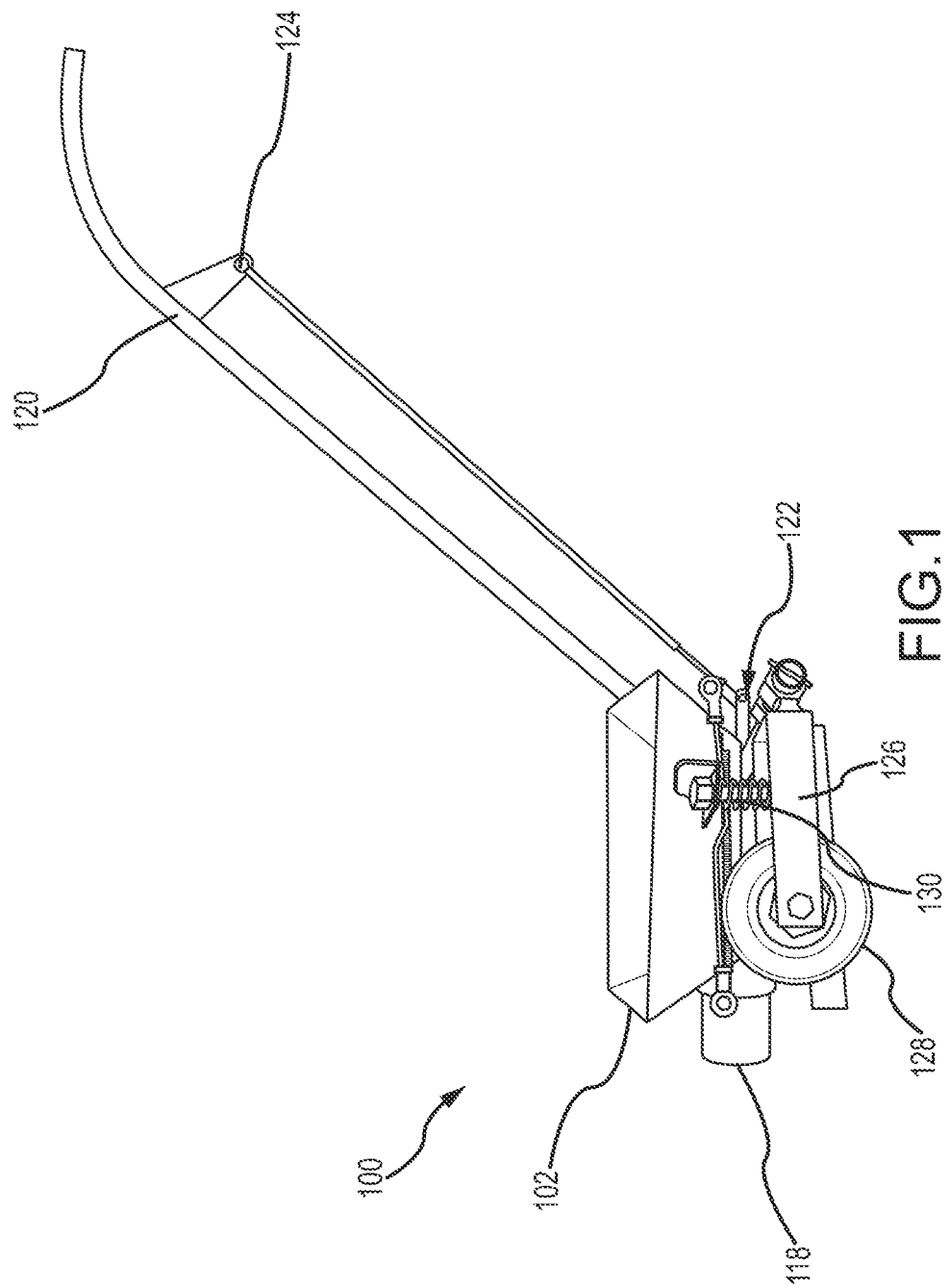
FIG. 1 is a perspective view of an exemplary applicator for micro-trenching.

Before the machines and methods that are the subject of this disclosure are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise.

A trench can generally be cut within a surface structure via any such excavation device(s) as required or desired. The surface structure typically includes one or more layers of a pavement structure above a native soil subgrade. For example, the surface structure may be a concrete and/or asphalt based roadway and/or walkway. Once the trench is formed, one or more cables, conduits, or the like may be installed therein, for example, communication fiber optic cables and the like. The trench can then be backfilled with a flowable fill mixture so as to cover the fiber optic cables and to facilitate repairing the surface structure. In examples, the trench may be a nano trench that is approximately ½ inch wide and 3-4 inches in depth, or a micro trench that is approximately 2 inches in width and 12-16 inches in depth. Because of the small sizes of the trench, pouring the flowable fill mixture into the trench is a more precise and time consuming process than backfilling larger trenches.

In examples, the flowable fill mixture may include at least water, cement, and aggregate components, and as such, it is a cement-based mixture. It is appreciated that the flowable fill mixture may have any number of components in order to mix the concrete with properties that are required or desired. Mixture components may include, but are not limited to, sand, gravel, stone, slag, fly ash, silica fume, polymers, chemical admixtures, etc. In aspects, the flowable fill mixture may be generated in a mobile volumetric mixing system described in U.S. Pat. No. 10,688,687, filed Nov. 6, 2017, and titled "VOLUMETRIC CONCRETE MIXING SYSTEM, EQUIPMENT, AND METHOD," which is hereby incorporated by reference in its entirety.

This disclosure describes applicators for micro-trenching and that are configured to pour the flowable fill cement-based mixture into the trench. For example, the applicators can be connected to the mobile volumetric mixing system to facilitate directly pouring the mixture into the trench in a more efficient process. The applicators reduce air-voids in the backfill and reduce mixture overflow while increasing clean-up efficiencies. As such, the amount of post backfill mixture manipulation (e.g., compaction and/or vibration) and clean-up is reduced, thereby enabling backfilling of the trench in a single pass. In examples, the applicators include an open-container hopper with a hose connector. The mixture flows into the hopper via the hose connector and is discharged from the hopper via an outlet opening that is positionable above the trench. The hopper is supported on a frame that enables the height of the outlet opening to be adjustable. In aspects, a plate is disposed at least partially around the outlet opening. The plate reduces mixture overflow of the trench during backfilling. A skirt may be coupled to the plate to help control mixture overflow. Additionally or alternatively, a sliding door for the outlet opening may be coupled to the plate and selectively control the size of the outlet opening. As such, the applicators enable for smaller trenches to be more quickly repaired and reduce construction closure times.

Figure 2:
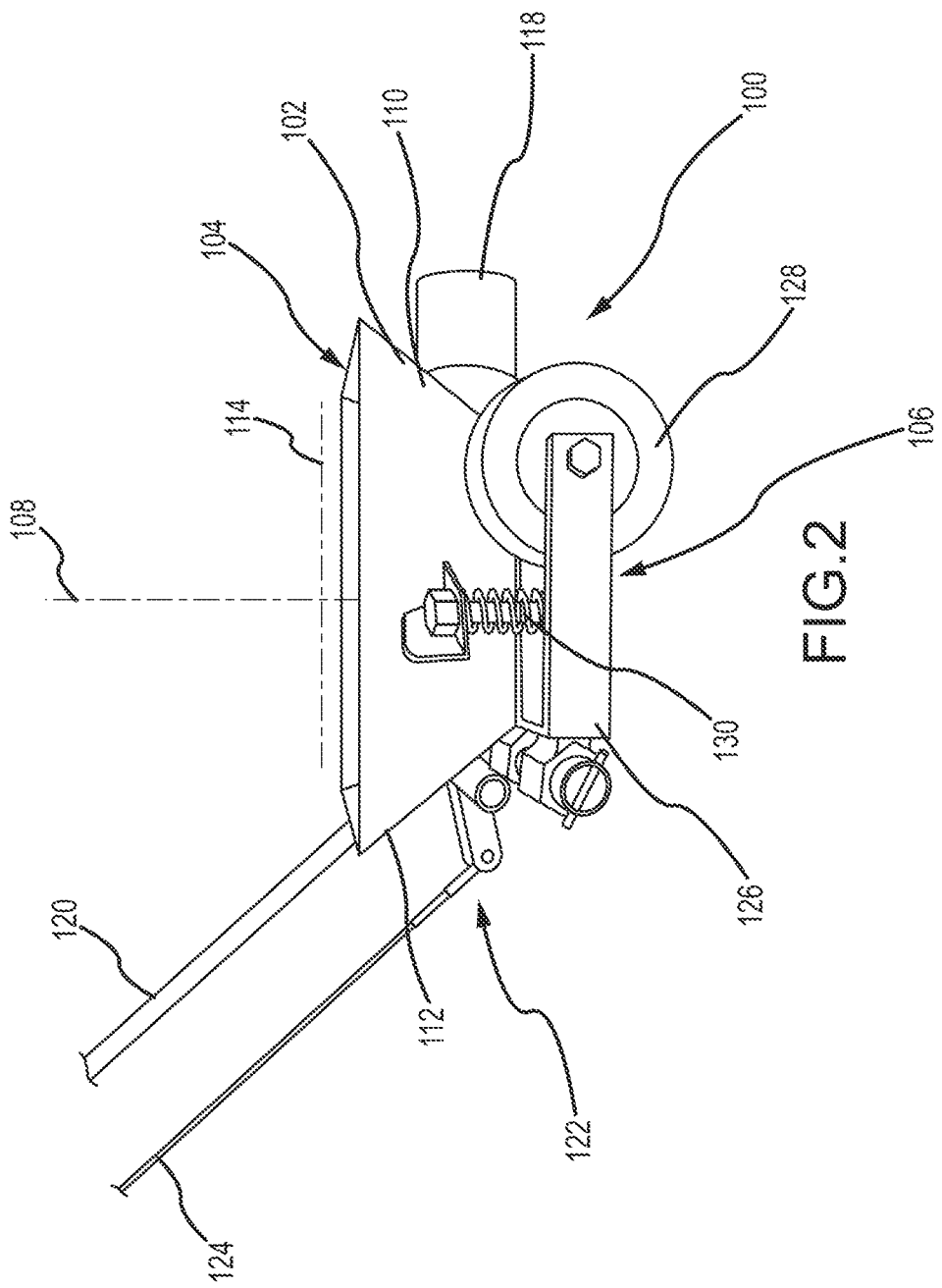
FIG. 2 is a side view of the applicator shown in FIG. 1.

FIG. 1 is a perspective view of an exemplary applicator 100 for micro-trenching. FIG. 2 is a side view of the applicator 100. Referring concurrently to FIGS. 1 and 2, the applicator 100 includes a hopper 102 that is configured to receive a flowable fill cement-based mixture as described above and facilitate backfilling a trench. The hopper 102 is an open container type hopper oriented in a vertical direction having a first end 104 disposed above an opposite second end 106 and that define a vertical axis 108. As such, the mixture is discharged from the hopper 102 via use of gravity. In the example, the hopper 102 is elongated along a horizontal direction having a first side 110 and an opposite second side 112 that define a horizontal axis 114. The horizontal axis 114 is orthogonal to the vertical axis 108 and generally corresponds to the surface that the trench is formed within.

The second end 106 of the hopper 102 defines an outlet opening 116 (shown in FIG. 6) that is configured to discharge the cement-based mixture from the hopper 102 and into the trench. The outlet opening 116 is elongated along the horizontal axis 114 so as to correspond to a direction of the trench. The first side 110 of the hopper 102 includes an interconnected hose connector 118. The hose connector 118 is configured to allow the cement-based mixture to selectively flow into the hopper 102. The hose connector 118 is disposed between the first and second ends 104, 106 of the hopper 102 along the vertical axis 108 and also extends substantially along the horizontal axis 114. At least a portion of the hose connector 118 projects from the first side 110 of the hopper 102. The hose connector 118 is substantially cylindrical in shape and is configured to receive a hose (not shown) that channels the cement-based mixture from a source, such as, a volumetric mixing system described above into the hopper 102. In the example, by forming an inlet for the cement-based mixture on the side wall of the hopper 102 via the hose connector 118 and keeping the first end 104 of the hopper 102 open, the backfill operator of the applicator 100 can more precisely control the backfill flow out of the hopper 102 to further reduce or eliminate trench mixture overflow. Furthermore, by reducing the amount of cement-based mixture that can be stored in the hopper 102, hardening of the cement-based mixture within the hopper 102 prior to being backfilled within the trench is reduced or prevented.

An operator handle 120 is coupled to the second side 112 of the hopper 102 and opposite of the hose connector 118 relative to the horizontal axis 114. By aligning the handle 120, the second end 106 of the hopper 102, and the hose connector 118 along the horizontal axis 114, the applicator 100 can trail behind a volumetric mixer so as to backfill the trench while moving therealong. A cut-off device 122 is coupled to the hose connector 118 so as to control flow of the cement-based mixture through the hose connector 118 and into the hopper 102. In the example, a lever arm 124 (e.g., a lever handle) of the cut-off device 122 is disposed on the handle 120 so that the operator can more easily control flow of the cement-based mixture into the hopper 102 without needing to reach down to the hopper 102.

The hopper 102 is supported on a frame 126 having a pair of wheels 128. The frame 126 is configured to position the second end 106 of the hopper 102 above the trench for backfilling. A height adjustor 130 is coupled between the frame 126 and the hopper 102 and is configured to selectively adjust a height of the second end 106 of the hopper 102 relative to the trench along the vertical axis 108. In the example, the wheels 128 are aligned with one another and are positioned between the two ends 110, 112 of the hopper 102.

In operation, the applicator 100 is configured to discharge the cement-based mixture directly into the trench so that air-voids are reduced during the backfill and with reducing or preventing overflowing the mixture from the trench. As such, the amount of post backfill mixture manipulation (e.g., compaction and/or vibration) and clean-up is reduced, thereby enabling backfilling of the trench in a single pass. In some examples, the applicator 100 may includes camera(s) and/or a laser indicator for increasing backfill precision and allowing the cement-based mixture to be poured to a level that has a required or desired meniscus in the trench.

Figure 3:
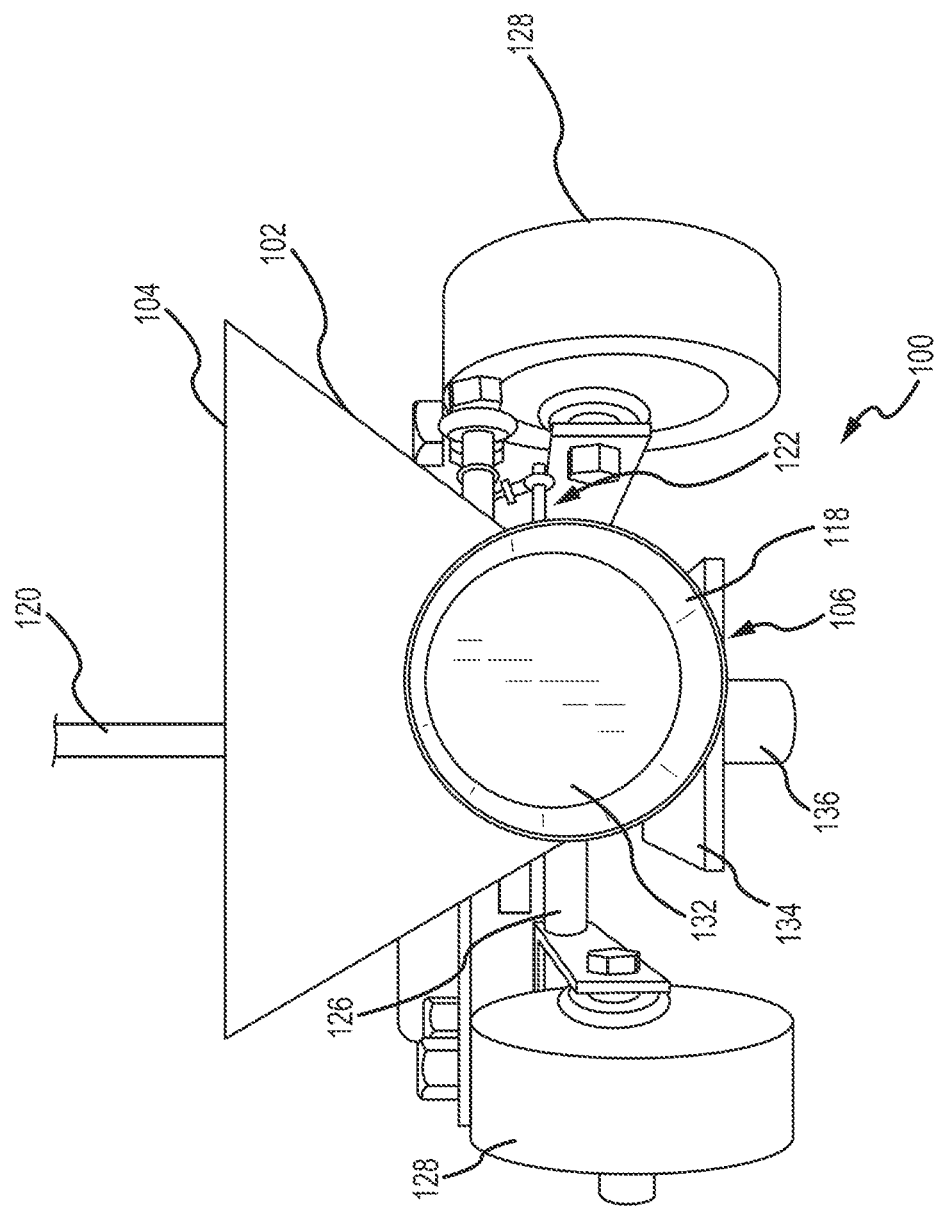
FIG. 3 is another side view of the applicator shown in FIG. 1.

FIG. 3 is another side view of the applicator 100. As described above, the hopper 102 is supported on the frame 126 having two wheels 128. The handle 120 is coupled to one side of the hopper 102 and the hose connector 118 is coupled to the opposite side of the hopper 102. The hose connector 118 is positioned below the first end 104 of the hopper 102. Mixture flow through the hose connector 118 is at least partially controlled by the cut-off device 122. The cut-off device 122 includes a rotatable cover 132 disposed within the hose connector 118. The cover 132 can selectively open and close (e.g., via the lever arm 124 (shown in FIG. 1)) so as to control mixture flow through the hose connector 118 and into the hopper 102. The operation of the cover 132 is described further below in reference to FIGS. 4 and 5.

At the second end 106 of the hopper 102, a plate 134 is disposed. The plate 134 facilitates backfilling the trench while reducing overflow of the cement-based mixture. The plate 134 at least partially surrounds a perimeter of the second end 106 of the hopper 102 and projects outward therefrom. The plate 134 may extend in both the left and right directions, as well as the front and back directions from the outlet opening as required or desired. In an aspect, the plate 134 is parallel to the horizontal axis 114 (shown in FIG. 2). In examples, the plate 134 may slide along the surface of the trench. A guide pin 136 is disposed proximate the second end 106 of the hopper 102 and adjacent the hose connector 118. The guide pin 136 extends parallel to the vertical axis 108 (shown in FIG. 2) and is configured to extend at least partially within the trench so that the hopper 102 can follow the shape of the trench as it moves. In some examples, the guide pin 136 can function a leveler and/or compactor for the trench as required or desired.

Figure 4:
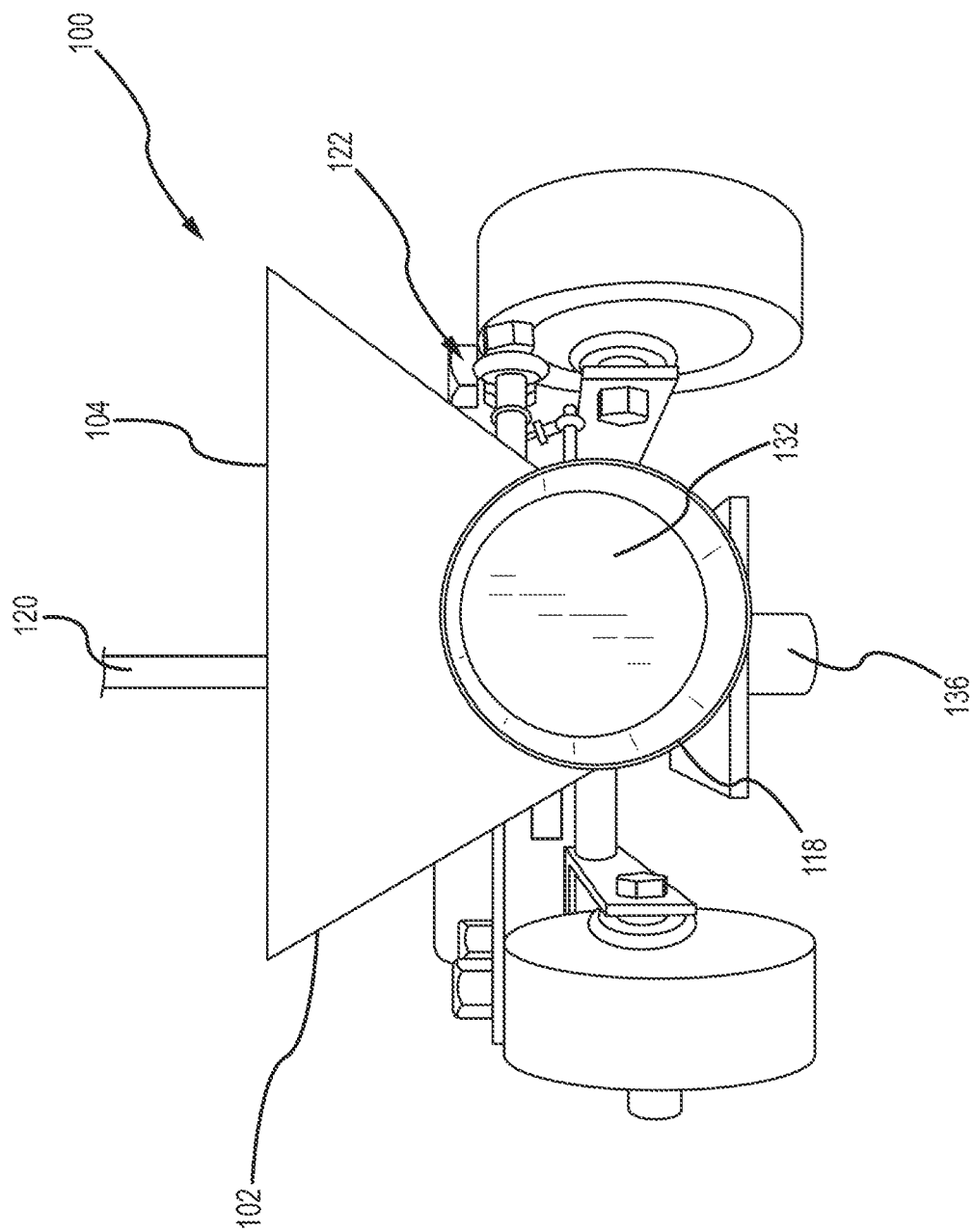
FIG. 4 is a side view of the applicator shown in FIG. 1 with a cut-off device in a closed configuration.
Figure 5:
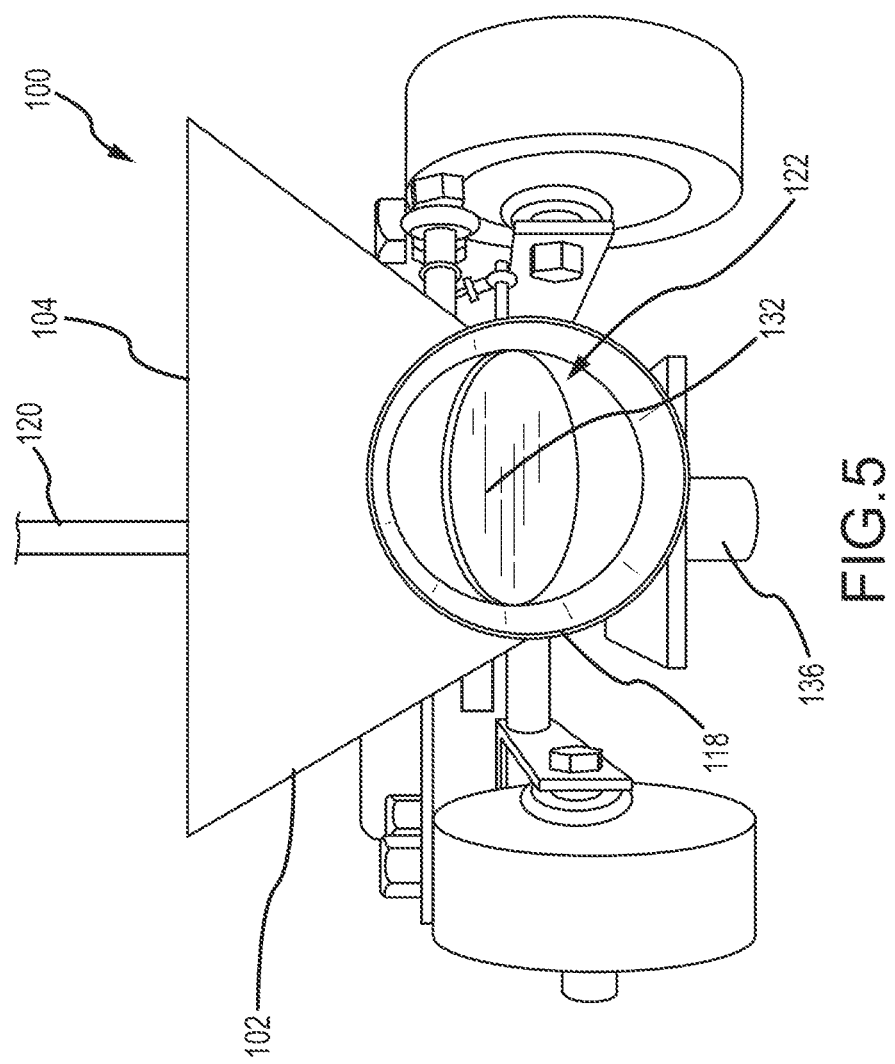
FIG. 5 is a side view of the applicator shown in FIG. 1 with the cut-off device in an open configuration.

FIG. 4 is a side view of the applicator 100 with the cut-off device 122 in a closed configuration. FIG. 5 is a side view of the applicator 100 with the cut-off device 122 in an open configuration. Referring concurrently to FIGS. 4 and 5, the cut-off device 122 includes the cover 132 that is rotatably mounted within the hose connector 118. The cut-off device 122 is configured to control the flow of the cement-based mixture into the hopper 102 so as to increase backfilling efficiencies. Additionally, by using the hose connector 118 as the inlet to the hopper 102, the first end 104 of the hopper 102 remains unobstructed so that the operator of the applicator 100 can more easily observe the backfilling process and the flow of the cement-based mixture. Further, continuous agitation of the mixture within the hopper 102 can be maintained during the backfilling operations.

The cover 132 is operably coupled to the lever arm 124 (shown in FIG. 1) on the handle 120 so that the operator can selectively control the position of the cover 132. In an aspect, the cover 132 is biased so as to automatically return to the closed configuration when the lever arm 124 is released. The cover 132 rotates around a rotation axis that is orthogonal to the horizontal axis 114 (shown in FIG. 2) and the axial direction of the hose connector 118. The rotation axis extends across the diameter of the hose connector 118. The cover 132 can be selectively rotated into any position between, and including, the open and closed configurations so as to control the flow of the cement-based mixture. The cover 132 is inwardly offset from the distal end of the hose connector 118 so that a hose (not shown) can couple to the hose connector 118. The guide pin 136 is disposed at least partially below the hose connector 118 and enables the applicator 100 to be guided along the trench during movement.

Figure 6:
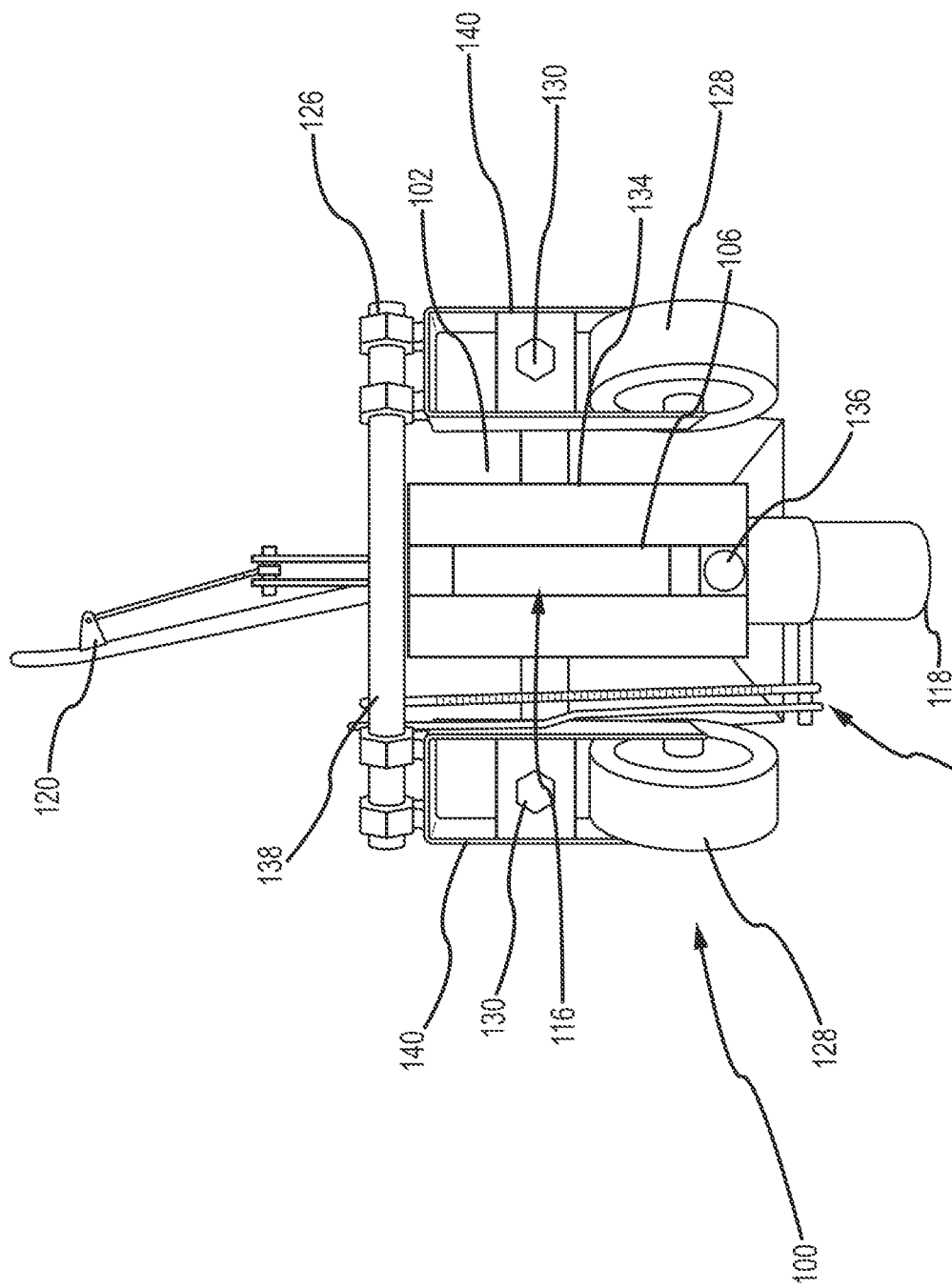
FIG. 6 is a bottom view of the applicator shown in FIG. 1.

FIG. 6 is a bottom view of the applicator 100. The second end 106 of the hopper 102 defines the outlet opening 116 so that the cement-based mixture can be discharged into the trench. The outlet opening 116 is elongated and corresponds to the shape of the hopper 102. The plate 134 at least partially surrounds the perimeter of the second end 106. In an aspect, the plate 134 completely surrounds the perimeter of the second end 106. The plate 134 is configured to reduce overflow of the cement-based mixture from the trench during operation. In an aspect, the plate 134 is configured to be positioned against the underlying surface and slide therealong. In another aspect, the width of the plate 134 around the outlet opening 116 is at least the width of the outlet opening 116.

In the example, the frame 126 is a U-shaped frame with a cross-member 138 that is coupled to the second side 112 of the hopper 102 and below the handle 120. The frame 126 also includes two opposing leg members 140 that extend from the cross-member 138. Each leg member 140 may be pivotably coupled to the cross-member 138 so that the height of the second end 106 of the hopper 102 above the underlying surface is adjustable via the height adjustor 130. The cross-member 138 is fixed to the hopper 102, while the leg members 140 are not directly coupled to the hopper 102. In an aspect, the height adjustor 130 is disposed between the wheel 128 and the cross-member 138, and coupled to each of the leg members 140. The wheel 128 is coupled to the free end of the leg member 140.

At least a portion of the cut-off device 122 may be positioned between the leg member 140 and the hopper 102. This configuration allows the hose connector 118 to be disposed on the opposite side of the handle 120 and provide some protection from the components of the cut-off device 122 extending outside of the hopper 102. In the example, the guide pin 136 is at least partially aligned with the wheels 128.

Figure 7:
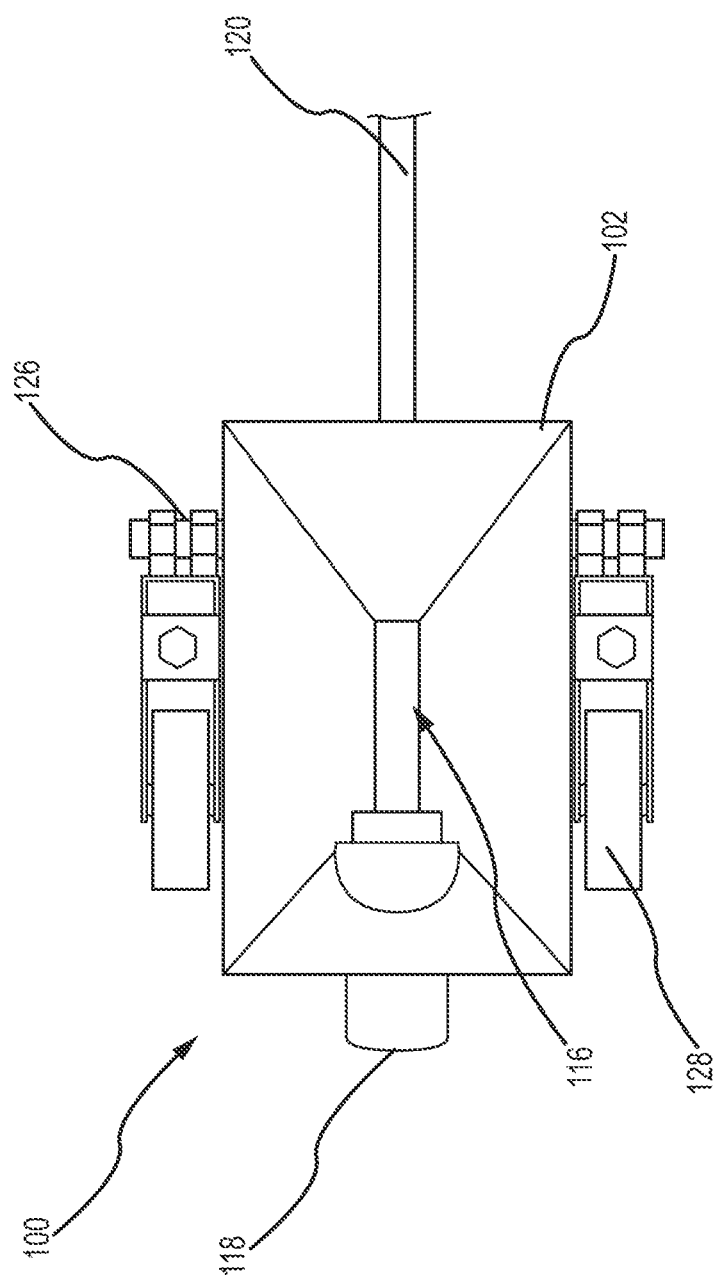
FIG. 7 is a top view of the applicator shown in FIG. 1.

FIG. 7 is a top view of the applicator 100. The hopper 102 is an open container hopper with the outlet opening 116 formed at the bottom and configured to discharge the cement-based mixture into the trench. The handle 120 is positioned opposite of the hose connector 118 along the horizontal direction, and the frame 126 and wheels 128 are disposed on either side of the hopper 102. In some examples, the hopper 102 may include a backsplash plate (not shown) that is disposed at about a 45° angle relative to the hose connector 118 so that the cement-based mixture shoots downward and towards the opposite side of the hopper 102 so as to increase flow into the trench and to increase visuals for the operator of the mixture that is within the hopper 102.

Figure 8:
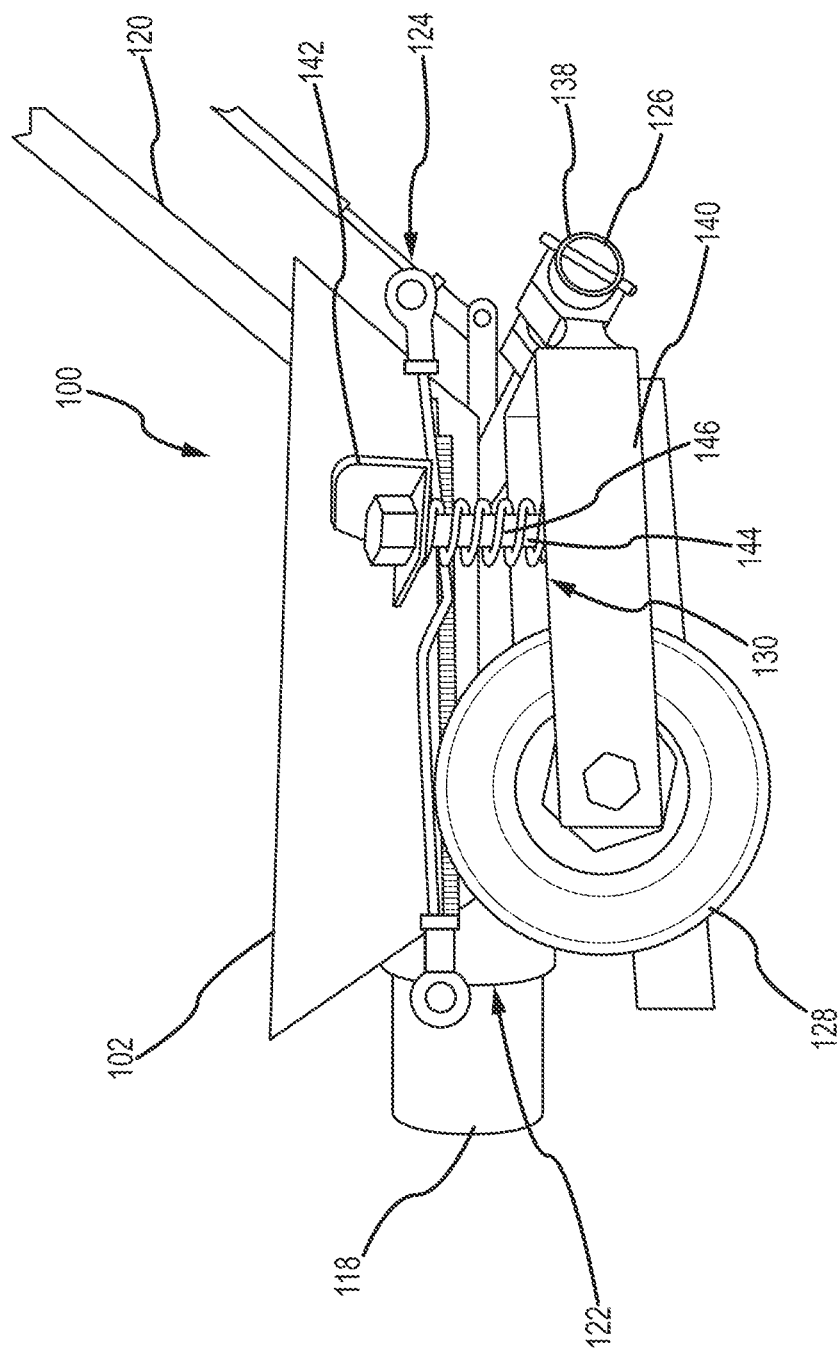
FIG. 8 is another side view of the applicator shown in FIG. 1.

FIG. 8 is another side view of the applicator 100. The height adjustor 130 extends between the leg member 140 of the frame 126 and a L-shaped bracket 142 extending from the outside of the hopper 102. The height adjustor 130 includes a compression spring 144 and an adjustable length strut 146. The height adjustor 130 coupled to the leg member 140 between the cross-member 138 and the wheel 128. This configuration enables the height of the hopper 102 relative to the underlying surface to be adjustable. Additionally, the spring 144 facilities a more uniform backfill pour when the applicator 100 is moving along curved trench section and/or uneven surfaces.

The cut-off device 122 includes one or more lever arms 124 that enable the user to control the flow of the cement-based mixture through the hose connector 118. In the example, the cut-off device 122 includes two lever arms 124. A first coupled to the rotatable cover within the hose connector 118 and configured to rotate the cover and a second extending adjacent the handle 120 and configured to move the first. A biasing spring may be used to bias the cut-off device 122 towards the closed configuration described above.

Figure 9:
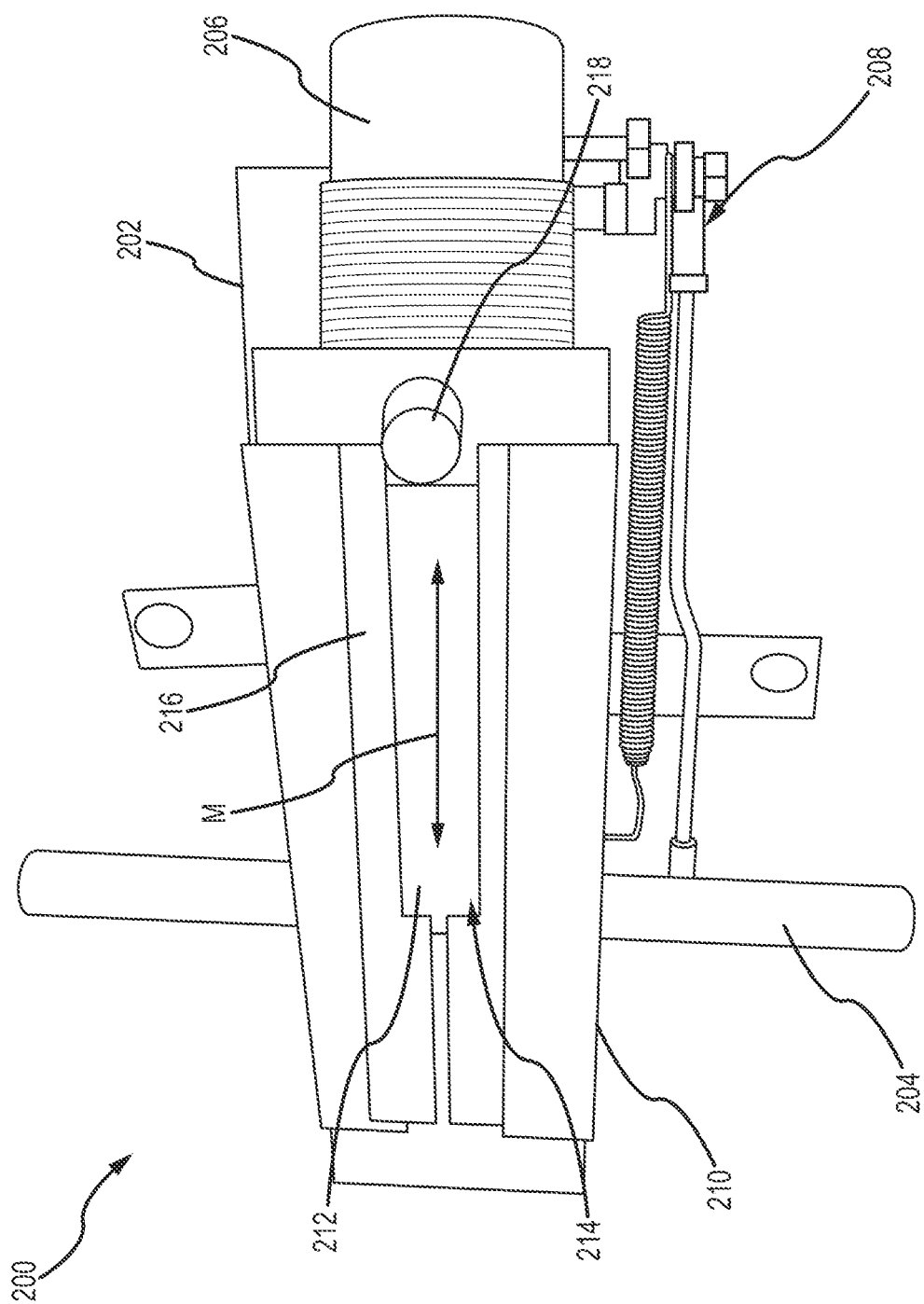
FIG. 9 is a partial bottom view of another applicator.

FIG. 9 is a partial bottom view of another applicator 200. Similar to the example described above, the applicator 200 includes an open container type hopper 202 having a frame 204 (only partially illustrated in FIG. 9), a hose connector 206, and a cut-off device 208 configured to backfill a trench with a flowable fill cement-based mixture. However, in this example, a plate 210 at the second end of the hopper 202 supports a sliding door 212 configured to selectively adjust a size of an outlet opening 214 of the hopper 202. The sliding door 212 allows the applicator 200 to adjust the amount of mixture being discharged from the hopper 202. The position of the sliding door 212 can be manually controlled, or automatically controlled via one or more camera(s) and/or sensor(s) as required or desired.

In the example, the outlet 214 is elongated in the horizontal direction and the sliding door 212 is selectively moveable M in a direction that is parallel to the horizontal direction. The sliding door 212 slides in a pair of tracks 216 that are coupled to the plate 210 and also extend in the horizontal direction. A guide pin 218 extends from the plate 210 and is disposed proximate the hose connector 206. The sliding door 212 slides in a direction that is away from the guide pin 218 and hose connector 206 to open and towards the guide pin 218 and hose connector 206 to close. By positioning the sliding end of the sliding door 212 proximate the hose connector 206, the cement-based mixture may more easily pour through the hopper 202 and reduce the storage time within the hopper 202.

Figure 11:
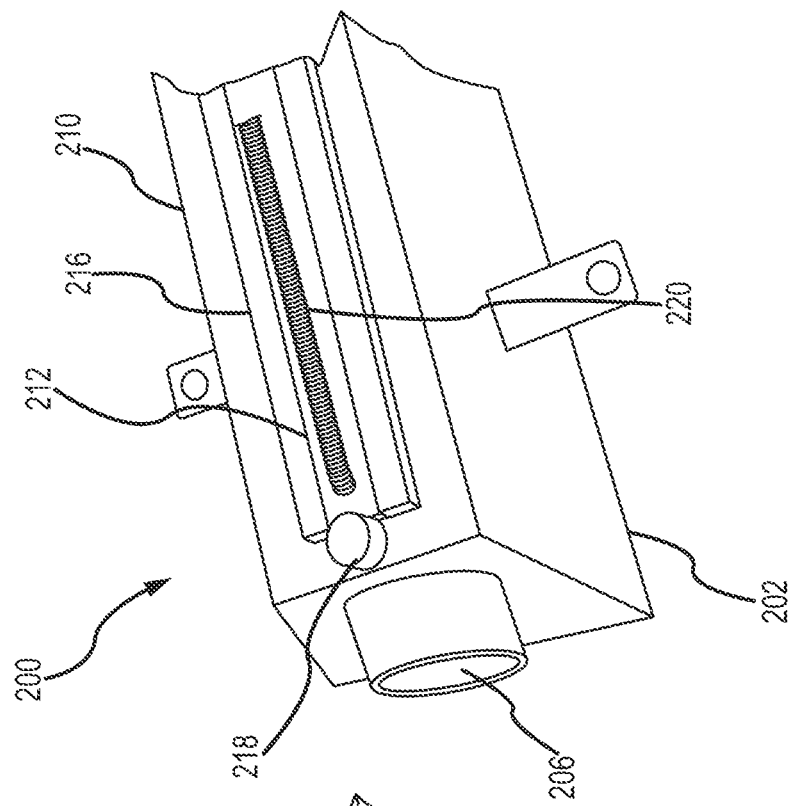
FIG. 11 is a bottom view of the applicator shown in FIG. 9 with the sliding door in a closed configuration.
Figure 10:
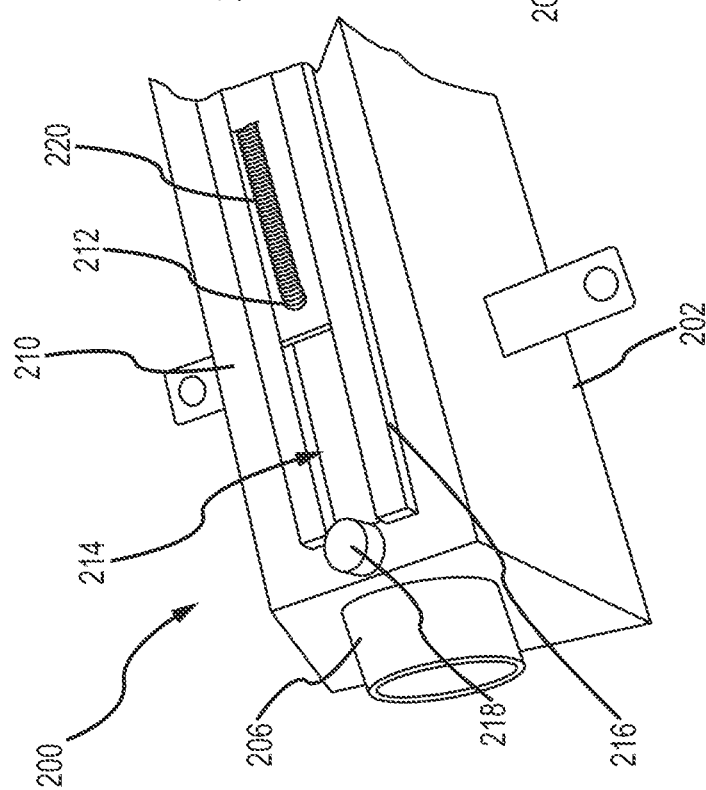
FIG. 10 is a bottom view of the applicator shown in FIG. 9 with a sliding door in an open configuration.

FIG. 10 is a bottom view of the applicator 200 with the sliding door 212 in an open configuration. FIG. 11 is a bottom view of the applicator shown 200 with the sliding door 212 in a closed configuration. Referring concurrently to FIGS. 10 and 11, certain components are described above, and thus, are not necessarily described further. In the example, the sliding door 212 is spring loaded via a spring 220 and is biased towards the closed configuration. The spring 220 is coupled to the sliding end of the sliding door 212, and in the example, extends along the outer surface of the sliding door 212 outside of the hopper 202. The sliding door 212 is parallel to the plate 210 and at least partially slides directly against the plate 210 during operation. Operation of the sliding door 212 may be controlled by the user at the handle as required or desired (e.g., via a lever arm (not shown)).

Figure 12:
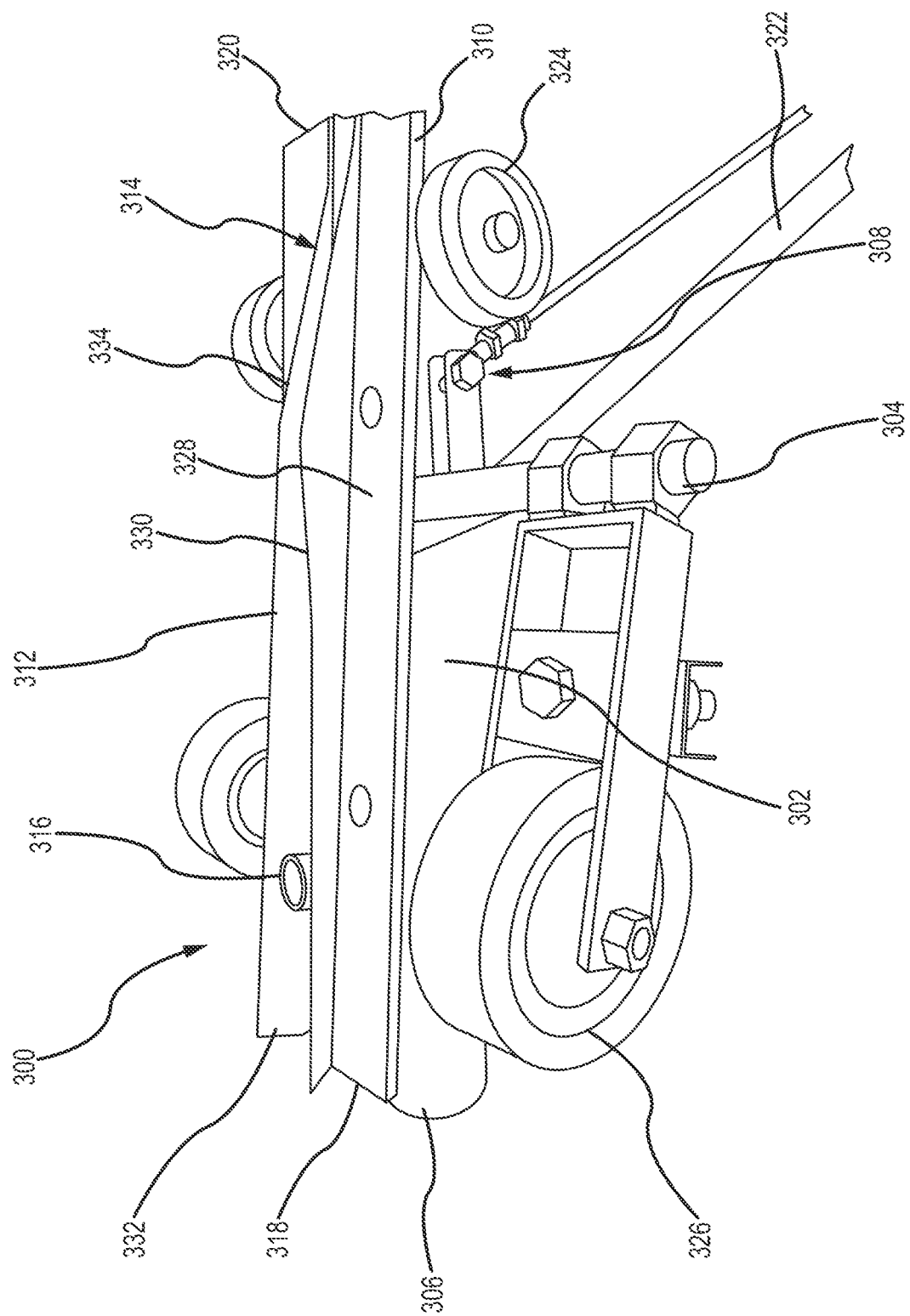
FIG. 12 is a bottom view of another applicator.

FIG. 12 is a bottom view of another applicator 300. Similar to the examples described above, the applicator 300 includes an open container type hopper 302 having a frame 304, a hose connector 306, and a cut-off device 308 configured to backfill a trench with a flowable fill cement-based mixture. However, in this example, a plate 310 at the second end of the hopper 302 supports a skirt 312 configured to extend at least partially into the trench when backfilling. The skirt 312 is configured to contain over-spill of the cement-based mixture during trench backfilling and reduces the mixture from flowing out over the sides of the trench. In aspects, the skirt 312 may be interchangeable on the plate 310 so that different sizes can be attached as required or desired.

In the example, the skirt 312 has a two piece symmetrical construction. The discrete two pieces of the skirt 312 are separated by a gap 314 that corresponds to the size of the trench and/or the outlet opening of the hopper 302 and allows the cement-based mixture to backfill the trench and flow through the skirt 312. A guide pin 316 may be disposed within the gap 314 of the skirt 312. The skirt 312 has a first end 318 disposed proximate the hose connector 306 and an opposite second end 320 disposed proximate a handle 322. The first end 318 and the second end 320 extend along a horizontal direction. In the example, the plate 310 extends from the frame 304 such that end which corresponds to the second end 320 of the skirt 312 is spaced from the hopper 302. In an aspect, the extension distance of the plate 310 is between 20%-50% of the elongated length of the outlet opening along the horizontal direction. By extending the plate 310 in the direction of the handle 322, the skirt 312 can also be elongated so as to increase interaction with the trench during backfill operations. The extension end of the plate 310 may be supported by a second pair of wheels 324 that are in addition to wheels 326 on the frame 304. The wheels 324 support the second end 320 of the skirt 312 so that the height of the skirt 312 above the trench during backfill operations can be maintained between the two ends 318, 320.

The skirt 312 is formed from a flexible material and each discrete piece has a first section 328 that is configured to mount to the plate 310. In an aspect, the flexible material may be a rubber-based material. The first section 328 is substantially planar to the horizontal direction. A second section 330 of the skirt 312 is folded downward and is configured to be at least partially inserted into the trench. The second section 330 positioned in a substantially vertical direction relative to the plate 310 and the first section 328. The length of the second section 330 may be based on the backfill level of the trench. For example, a smaller length skirt may be used so that the cement-based mixture can pour to the top of the trench, while a longer length skirt may extend further into the trench and facilitate the mixture to pour to a level that is ½ inch below the surface so that a top sealant can be applied. In other examples, the skirt 312 can have a length that levels the mixture at 1 inch or 2 inches below the surface as required or desired.

The first end 318 of the skirt 312 has the second section 330 in a flared configuration 332 so as to increase engagement with the sidewalls of the trench when moving therealong. The second end 320 of the skirt 312 has the second section 330 in a tapered configuration 334 so as to more easily release engagement with the sidewalls and facilitate leveling the pour level of the cement-based mixture within the trench. In an aspect, the tapered configuration 334 terminates prior to the second end 320 of the skirt 312. The length of the flared configuration 332 may be about 2 inches. In other examples, the length of the flared configuration 332 may be about 1 inch or about 1½ inches as required or desired. The skirt 312 may be completely removed from the applicator 300 as required or desired and the applicator 300 used with just the plate 310 as described above.

Figure 13:
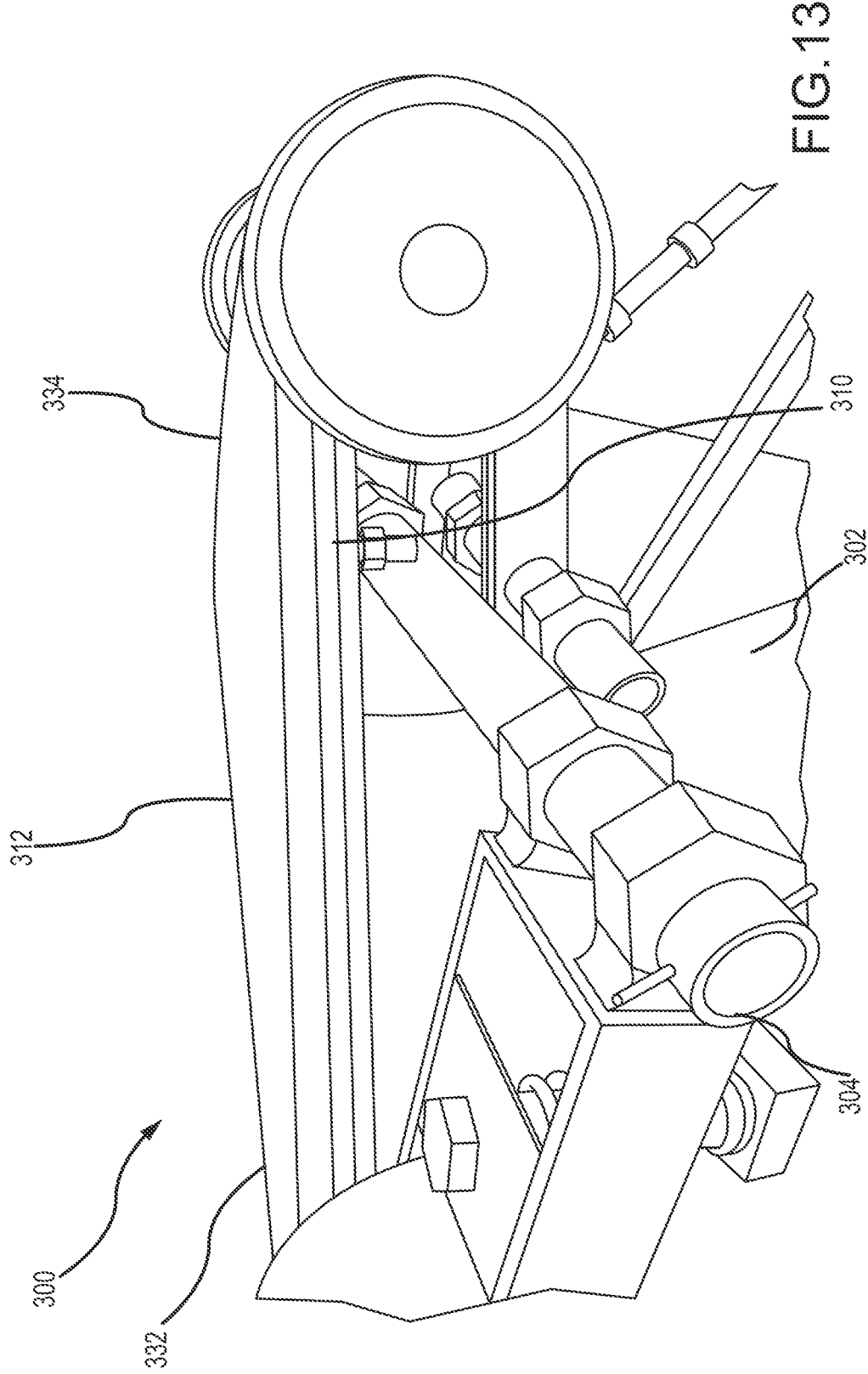
FIG. 13 is a partial perspective view of the applicator shown in FIG. 12 with a skirt.
Figure 14:
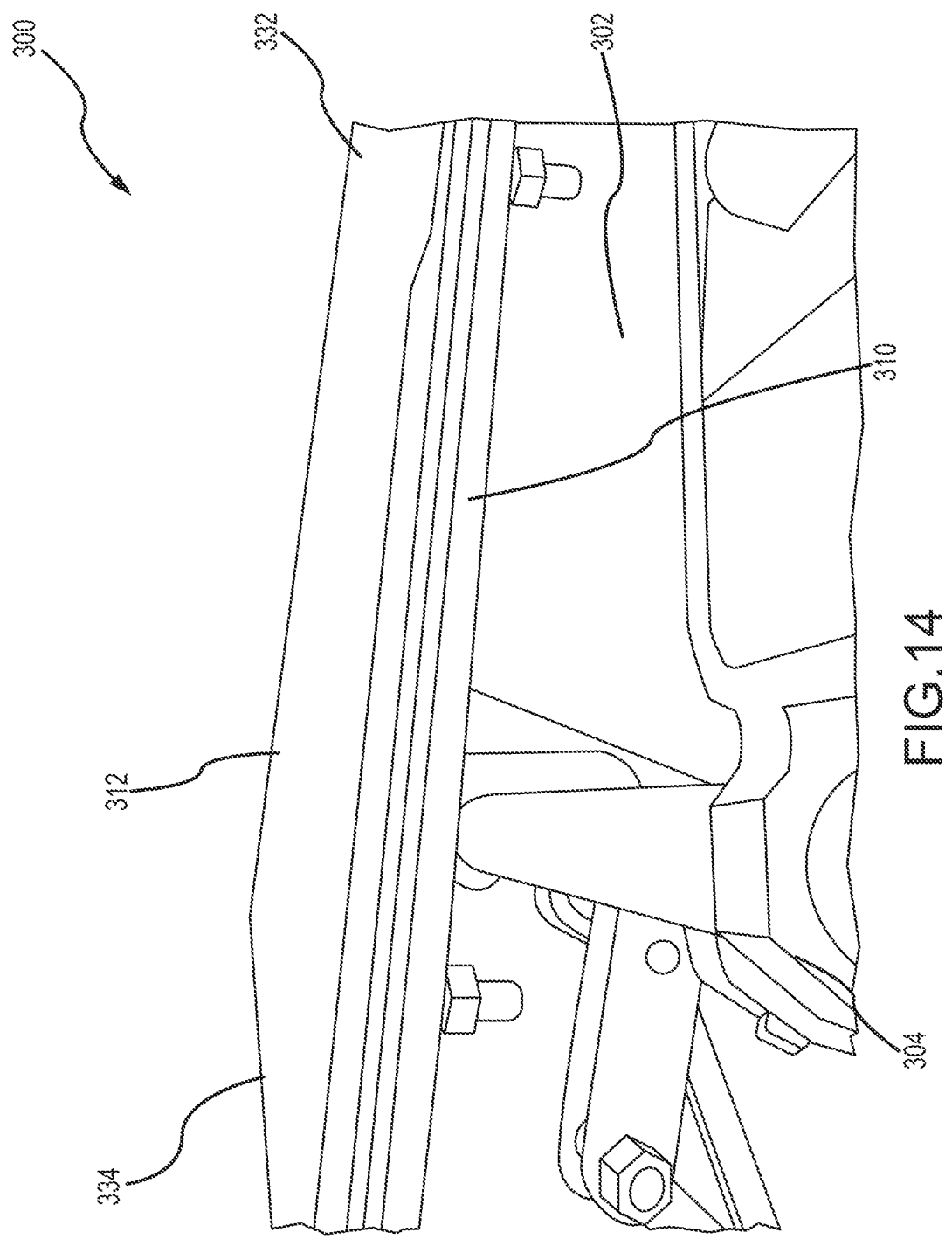
FIG. 14 is another partial perspective view of the applicator shown in FIG. 12 with the skirt.

FIG. 13 is a partial perspective view of the applicator 300 with the skirt 312. FIG. 14 is another partial perspective view of the applicator 300 with the skirt 312. Referring concurrently to FIGS. 13 and 14, the skirt 312 is coupled to the plate 310 and both the plate 310 and the skirt 312 project outwards from the hopper 302 and the frame 304 towards the direction of the handle. In the example, the tapered configuration 334 of the skirt 312 is positioned on the outward projection section of the skirt 312 with the flared configured 332 being disposed directly underneath the hopper 302. As such, the flared configuration 332 is longer than the outlet opening of the hopper 302. This configuration reduces or prevents the cement-based mixture from overflowing the trench and reducing the clean-up needed after the backfilling operations.

Figure 15:
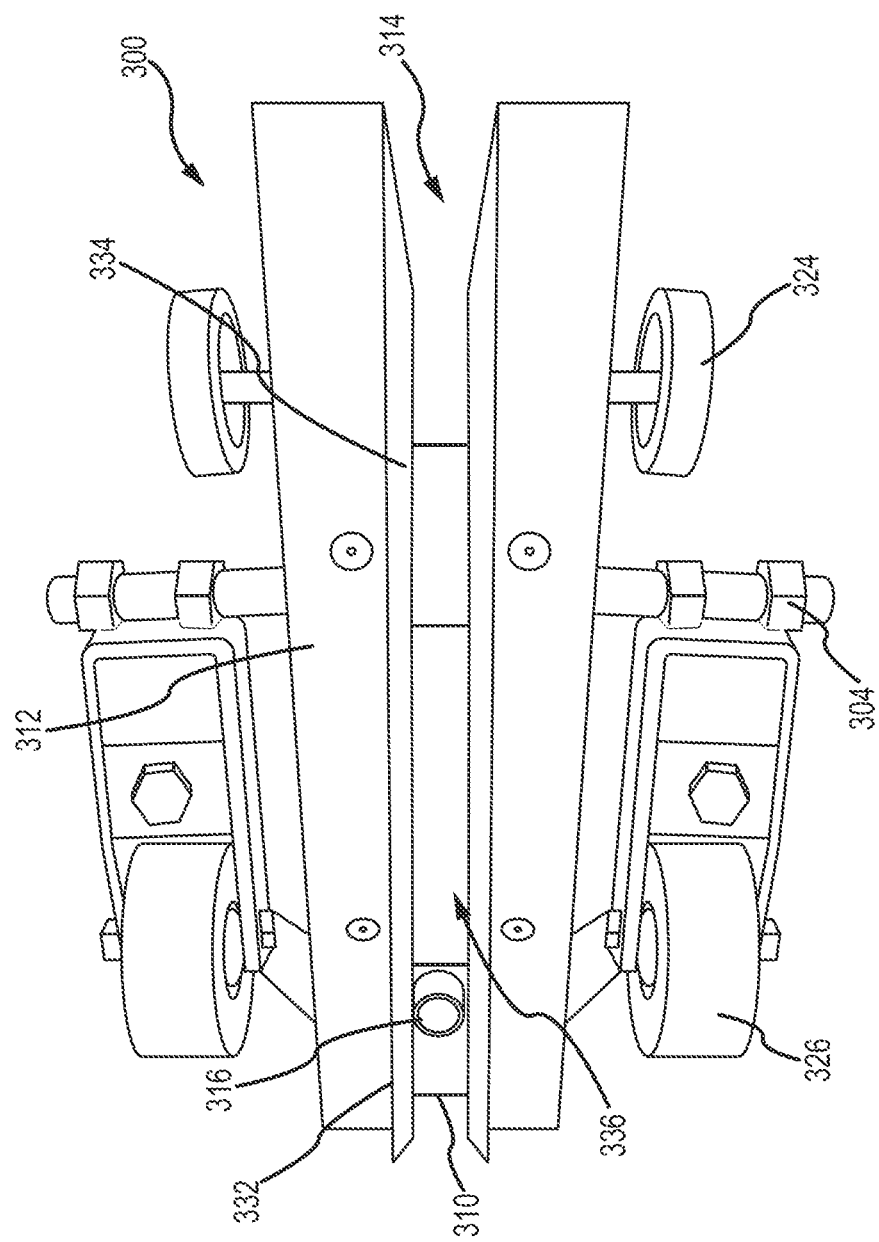
FIG. 15 is another bottom view of the applicator shown in FIG. 12 with the skirt.

FIG. 15 is another bottom view of the applicator 300 with the skirt 312. Certain components are described above, and thus, are not necessarily described further. The gap 314 between the two skirt pieces extends the entire direction of the skirt 312. The guide pin 316 is disposed within the gap 314 and adjacent to the flared configuration 332 of the skirt 312. The plate 310 surrounds the perimeter of an outlet opening 336 of the hopper. The flared configuration 332 of the skirt 312 is positioned at the outlet opening 336 and the guide pin 316. The tapered configuration 334 of the skirt 312 is offset from the outlet opening 336 an in a direction towards the handle. In some examples, the tapered configuration 334 may begin at the outlet opening 336 of the hopper.

As described above the applicators are configured to discharge the flowable fill cement-based mixture into the trench. The applicators reduce air-voids in the backfill and reduce mixture overflow while increasing clean-up efficiencies. As such, the amount of post backfill mixture manipulation (e.g., compaction and/or vibration) and clean-up is reduced, thereby enabling backfilling of the trench in a single pass. As such, the applicators enable for smaller trenches to be more quickly repaired and reduce construction closure times.

It will be clear that the systems and methods described herein are well adapted to attain the ends and advantages mentioned as well as those inherent therein. Those skilled in the art will recognize that the methods and apparatuses within this specification may be implemented in many manners and as such is not to be limited by the foregoing exemplified embodiments and examples. In this regard, any number of the features of the different embodiments described herein may be combined into one single example and alternate examples having fewer than or more than all of the features herein described are possible.

While various examples have been described for purposes of this disclosure, various changes and modifications may be made which are well within the scope contemplated by the present disclosure. For example, the applicator may include both the sliding door and the skirt. Numerous other changes may be made which will readily suggest themselves to those skilled in the art and which are encompassed in the spirit of the disclosure and as defined in the appended claims.

What is claimed is:

1. An applicator for a cement-based mixture comprising:
   an open container hopper having a first end disposed above a second end along a first direction, the open container hopper elongated along a second direction, wherein the first direction is orthogonal to the second direction, and wherein the second end of the open container hopper is configured as an outlet for the cement-based mixture;
a plate surrounding a perimeter of the second end of the open container hopper and extending outward from the outlet, wherein the plate supports a skirt having a length configured to extend at least partially into a trench when backfilling, wherein the skirt is formed form a flexible material having a first piece and an opposite second piece disposed on opposite sides of the second end of the open container hopper, and wherein the skirt includes a flared section with a full length and a tapered section whereby the length shortens;
a handle coupled to one side of the open container hopper;
a hose connector coupled to another side of the open container hopper opposite of the handle relative to the first direction, wherein the hose connector is configured to allow the cement-based mixture to flow into the open container hopper;
a frame having a pair of wheels, wherein the open container hopper is supported on the frame such that the second end is positionable above the trench for backfilling; and
a height adjustor coupled between the frame and the open container hopper, wherein the height adjustor is configured to selectively adjust a height of the second end relative to the trench and along the first direction.

2. The applicator of claim 1, wherein the frame is a U-shaped frame having a cross-member and two opposing leg members, the cross-member coupled to the side of the open container hopper that the handle is coupled to.

3. The applicator of claim 2, wherein each of the pair of wheels is coupled to a free end of a respective leg member of the two opposing leg members of the frame.

4. The applicator of claim 3, wherein each of the two opposing leg members are pivotably coupled to the cross-member.

5. The applicator of claim 3, wherein the height adjustor is disposed between the wheel and the cross-member on each of the two opposing leg members.

6. The applicator of claim 1, wherein the height adjustor comprises a compression spring and an adjustable length strut.

7. The applicator of claim 1, further comprising a guide pin disposed proximate the second end of the open container hopper and adjacent the hose connector.

8. The applicator of claim 1, further comprising a cut-off device configured to control the flow of the cement-based mixture through the hose connector.

9. The applicator of claim 8, wherein a lever arm for the cut-off device is disposed on the handle.

10. An applicator for a cement-based mixture comprising:
an open container hopper having a first end disposed above a second end along a first direction, the open container hopper elongated along a second direction, the first direction being orthogonal to the second direction, and wherein the second end of the open container hopper is configured as an outlet for the cement-based mixture;
a hose connector coupled to one side of the open container hopper and extending along the second direction, wherein the hose connector is configured to allow the cement-based mixture to flow into the open container hopper;
a frame having a pair of wheels, wherein the open container hopper is supported on the frame such that the second end is positionable above a trench for backfilling; and
a plate at least partially surrounding a perimeter of the second end of the open container hopper, wherein the plate supports a sliding door configured to selectively adjust a size of the outlet at the second end of the open container hopper, wherein the sliding door slides in a direction that is away from the hose connector to open and towards the hose connector to close, and wherein the plate supports a skirt configured to extend at least partially into the trench when backfilling, wherein the skirt is formed form a flexible material having a first piece and an opposite second piece disposed on opposite sides of the second end of the open container hopper, and wherein the skirt includes a flared section disposed below the hose connector and an opposite tapered section.

11. The applicator of claim 10, wherein the sliding door is spring loaded and biased towards a closed configuration.

12. The applicator of claim 10, wherein the sliding door slides in a direction that is parallel to the second direction.

13. The applicator of claim 10, wherein the sliding door slides in a pair of tracks extending along the second direction.

14. The applicator of claim 10, further comprising a cut-off device configured to control the flow of the cement-based mixture through the hose connector.

15. An applicator for a cement-based mixture comprising:
an open container hopper having a first end disposed above a second end along a first direction, the open container hopper elongated along a second direction, the first direction being orthogonal to the second direction, and wherein the second end of the open container hopper is configured as an outlet for the cement-based mixture;
a hose connector coupled to one side of the open container hopper and extending along the second direction, wherein the hose connector is configured to allow the cement-based mixture to flow into the open container hopper;
a frame having a pair of wheels, wherein the open container hopper is supported on the frame such that the second end is positionable above a trench for backfilling; and
a plate at least partially surrounding a perimeter of the second end of the open container hopper, wherein the plate supports a skirt configured to extend at least partially into the trench when backfilling, wherein the skirt is formed from a flexible material, and wherein the skirt includes a flared section and a tapered section, the flared section disposed proximate the hose connector and the tapered section opposite the flared section.

16. The applicator of claim 15, wherein the skirt includes two discrete members separated by a gap corresponding to a size of the outlet formed by the second end of the open container hopper.

17. The applicator of claim 15, wherein the plate is supported by at least one additional wheel.

* * * * *